United States Patent

Monson et al.

[11] Patent Number: 5,238,008
[45] Date of Patent: Aug. 24, 1993

[54] INFLATABLE BLADDER SYSTEM FOR MONITORING LUNG PRESSURE

[75] Inventors: Conrad B. Monson, Yorba Linda; William J. Adams, Torrance, both of Calif.

[73] Assignee: Rockwell International Corporation, Seal Beach, Calif.

[21] Appl. No.: 651,874

[22] Filed: Feb. 7, 1991

[51] Int. Cl.$^5$ .................................................. A61B 5/00
[52] U.S. Cl. .............................. 128/748; 128/204.23; 600/20
[58] Field of Search .............. 128/748, 204.23, 204.29, 128/721, 720, 730, 719, 725, 727, 728, 28, 30, 3.2, 716; 600/19, 20

[56] References Cited

U.S. PATENT DOCUMENTS

| | | | |
|---|---|---|---|
| 2,194,809 | 3/1940 | Powell, Jr. | 128/721 |
| 3,089,482 | 5/1963 | Gray | 600/19 |
| 3,106,203 | 10/1963 | Mayo et al. | 600/19 |
| 3,577,977 | 5/1971 | Ritzinger et al. | 600/20 |
| 4,031,885 | 6/1977 | Davis et al. | 128/720 |
| 4,077,400 | 3/1978 | Harrigan | 128/28 |
| 4,202,212 | 5/1980 | Allen et al. | 128/730 |
| 4,243,024 | 1/1981 | Crosbie et al. | 128/25 R |
| 4,349,015 | 9/1982 | Alferness | 128/28 |
| 4,638,791 | 1/1987 | Krogh et al. | 128/204.29 |
| 4,744,356 | 5/1988 | Greenwood | 128/721 |
| 4,799,476 | 1/1989 | McGrady | 600/20 |
| 4,858,606 | 8/1989 | Hamlin | 128/204.29 |
| 4,925,133 | 5/1990 | Wurst et al. | 244/118.5 |
| 4,945,899 | 8/1990 | Sugiyama et al. | 128/28 |
| 5,007,893 | 4/1991 | Row | 600/20 |

*Primary Examiner*—Max Hindenburg
*Assistant Examiner*—Guy V. Tucker
*Attorney, Agent, or Firm*—Lawrence N. Ginsberg; Charles T. Silberberg

[57] ABSTRACT

A flexible bladder is provided which may be positioned over the chest of a subject. The flexible bladder contains fluid having substantially the same density as the breathing gas in the subject's lungs. Pressure sensing means are connected to the flexible bladder for monitoring bladder pressure. The bladder pressure is substantially the same as the subject's lung pressure. Thus, the bladder assembly may be used for monitoring lung pressure and controlling the pressure of breathing gas to the subject.

8 Claims, 4 Drawing Sheets

INFLATABLE BLADDER SYSTEM FOR MONITORING LUNG PRESSURE

BACKGROUND OF THE INVENTION

1. Field of the Invention

This invention relates to bladder assemblies for monitoring lung pressure and more particularly to a bladder assembly for matching the lung pressure of a subject with the pressure in a positive pressure breathing system.

2. Description of the Related Art

Modern high performance fighter aircraft are capable of flight maneuvers which subject the crew members to very high accelerations, "G's", particularly in the head-to-foot direction. Severe stresses are placed upon the crew members by such aircraft maneuvers. Indeed, many modern aircraft are capable of aerial maneuvers which are beyond the tolerance of the human crew members. Consequently, fighter aircraft and their crew members are occasionally lost as a result of G-induced Loss of Consciousness (G-LOC).

Many military jet aircraft have service ceilings above 40,000 feet and are equipped with oxygen administered to the air crew member through an oxygen mask worn about the mouth and nose. Typically, the oxygen system is a demand type apparatus wherein the oxygen is inhaled and exhaled as the air crew member's lungs expand and contract. However, as the aircraft cockpit reaches an altitude of 40,000 feet or more, the oxygen must be supplied to the lungs at a pressure exceeding that of the cockpit to prevent hypoxia. Typically, the aircraft will include a positive pressure breathing system which automatically supplies oxygen under pressure to the mask and into the air crew member's lungs to ensure an adequate supply of oxygen is maintained therein.

It has been found that high altitude positive pressure breathing is aided by exerting pressure against the upper portion of the body, particularly around the chest and abdominal areas, because the pressure exerted assists the air crew member in exhaling breath gases from the lungs against the positive pressure in the face mask. Therefore, an inflatable garment called a counterpressure garment is worn around the chest and back area so that during positive pressure breathing the counterpressure garment is also inflated to the same pressure as in the mask. It is also desirable in a high altitude environment to pressurize the anti-g suit to a predetermined ratio of the positive pressure in the breathing mask; e.g. typically four times mask pressure.

It has also been found that G protection is enhanced by positive pressure breathing because the increase in breathing pressure causes an approximately equal increase in heart level blood pressure, thereby increasing the flow of blood to the brain. Therefore, it is sometimes desirable to initiate positive pressure breathing at some minimum G force level. When the predetermined level of G force is encountered, or when the pressure in the anti G suit reaches an equivalent value, a signal is transmitted to a breathing regulator to initiate positive pressure breathing to the face mask, which by means of a valving system automatically initiates inflation of the counter pressure garment.

U.S. Pat. No. 4,638,791, entitled "Apparatus and Methods for Providing Rapid Protection from Accelerative Forces Experienced by Aircraft Crew Members," issued to S. B. Krogh et al., discloses regulation of pressure in a positive pressure breathing (PPB) system by movement of an aircraft control stick. This movement signals an impending aircraft acceleration. PPB and G suit levels are then adjusted to protect the pilot against this acceleration. In the Krogh disclosure, readings from airplane accelerometers are also used to control the level of PPB and G suit pressure.

U.S. Pat. No. 4,243,024, entitled "G-Protection System Sensing a Change in Acceleration and Tilt Angle", issued to R. J. Crosbie et al., discloses the use of measurements of aircraft acceleration and seat angle to control suit pressure.

U.S. Pat. No. 4,858,606, entitled "Low Pressure Breathing Regulators and Breathing Gas Systems Incorporating the Same", issued to H. A. S. Hamlin, discloses the control of the flow of air through a PPB regulator via a G sensitive valve.

All of the above mentioned inventions use indirect measures of pilot G force to regulate pressure. None of these inventions use direct measurements of the G forces on the pilots that control PPB and G suit pressure. Furthermore, none of these inventions account for body positioning. The position of the pilot's body in relation to the G force can significantly affect a pilot's G tolerance. Use of indirect measures of pilot G forces that do not account for body positioning may result in excessive or insufficient pressurization of a PPB system or a G suit.

Present assignee, Rockwell International Corporation, has previously proposed two solutions for solving the problem of high "G" accelerations. However, neither of these previously proposed solutions address the problem of body positioning and appropriate levels of pressurization for a PPB System or an anti-G suit. For example, U.S. Pat. No. 4,925,133. issued to S. G. Wurst et al. entitled "Hydraulic Buoyancy Force Suit" (assigned to Rockwell International Corporation) discloses a buoyancy force suit having at least two layers of flexible material with a substantially compressible fluid disposed therebetween. A fluid reservoir in fluid communication with the space between the layers maintains a constant fluid level with the buoyancy suit during acceleration. The fluid reservoir is supported at substantially the subject's eye level for maintaining an optimal fluid pressure gradient for ensuring an efficient blood supply to the subject's brain.

The force suit provides a balanced counterpressure to the force of acceleration, the force suit exerting pressure on substantially all body surfaces underneath the suit. However, the buoyancy force suit still requires positive pressure breathing to counter the force of the water in the suit against the chest.

U.S. Pat. No. 4,923,147, issued to H. J. Adams et al., entitled "Head Support/Spine Offloading Ejection Seat Insert" (also assigned to Rockwell International Corporation), discloses a seat insert (HS/SOD) which is insertable within the existing seat of a vehicle for maintaining a crew member of the vehicle in a forward posture during high G accelerations.

The HS/SOD works effectively to offload the spine of a pilot. However, the straps connecting the chest-plate and backplate components of the seat insert must be tight. This may be problematic, there being a fine line between the tightness required for effectively offloading the spine and the loose fit required for comfort and unimpaired respiration. It is difficult to have these straps tight and yet comfortable unless the pilot's chest dimensions closely match those of the chestplate component. The problem of tightness and comfort can be alleviated by the bladder system described in this disclosure.

OBJECTS AND SUMMARY OF THE INVENTION

It is a principle object of the present invention to efficiently monitor lung pressure.

Another object is to provide a measure of lung pressure so as to effectively control the pressure in PPB systems and in G suits.

Yet another object is to enhance the effectiveness of seat inserts of the type which are insertable within seats of vehicles for maintaining crew members in forward postures during high G accelerations.

Still another object of the present invention is to enhance the effectiveness of hydraulic buoyancy force suits of the type that provide a balanced counterpressure to the force of high G accelerations.

These objects are achieved by the present invention which, in its broadest aspects, includes a flexible bladder positioned over the chest of a subject. The flexible bladder contains fluid having substantially the same density as the breathing gas in the subject's lungs. Pressure sensing means are connected to the flexible bladder for monitoring bladder pressure. The bladder pressure is substantially the same as the subject's lung pressure. Thus, the bladder assembly may be used for monitoring lung pressure.

In its more narrower aspects, the invention may be used for matching the lung pressure of the subject with the pressure in a positive pressure breathing system. A bladder assembly is included which comprises at least one flexible bladder positioned over the chest of the subject. The bladder contains fluid having substantially the same density as the breathing gas in the subject's lungs. A fluid source is provided for supplying fluid having substantially the same density as the breathing gas in the subject's lungs. Pressure conduit means are connected between the bladder and the fluid source, including valve means, for regulating the flow of fluid from the source to the bladder. Pressure sensing means is connected to the fluid conduit means for monitoring bladder pressure. Pressure sensing means is connected to a positive pressure breathing system which provides the subject with breathing gas. The positive pressure breathing system includes control means for matching the pressure in the bladder to the pressure of the breathing gas in the subject's lungs.

Thus, the G forces compressing the lungs also compress the air filled bladder worn on the subject's chest. Because the bladder is adjacent to the lungs, the direction and magnitude of the G forces acting on the lungs is the same as the direction and magnitude of the G forces acting on the bladder. Furthermore, because it contacts the chest, the bladder will respond to changes in breathing rate and depth of respiration and other respiratory functions providing a more accurate control of PPB flow so that PPB flow is regulated to actual need rather than to some arbitrary schedule that controls PPB flow without consideration of respiratory function or pilot position within the G field.

The inflatable bladders used in conjunction with the buoyancy force suit disclosed in U.S. Pat. No. 4,925,133 will allow the pressure in a positive pressure breathing system to be matched to the pressure in the suit and thus provide a counter pressure force that closely matches respiratory need.

Using the present invention in conjunction with the seat insert disclosed in U.S. Pat. No. 4,923,147 enhances the G-protection capabilities of the seat insert. By using inflatable bladders as a cushion between the chestplate disclosed in that patent, and the chest, the straps can be tight without being uncomfortable and without impairing respiration.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENTS

Figure 1:
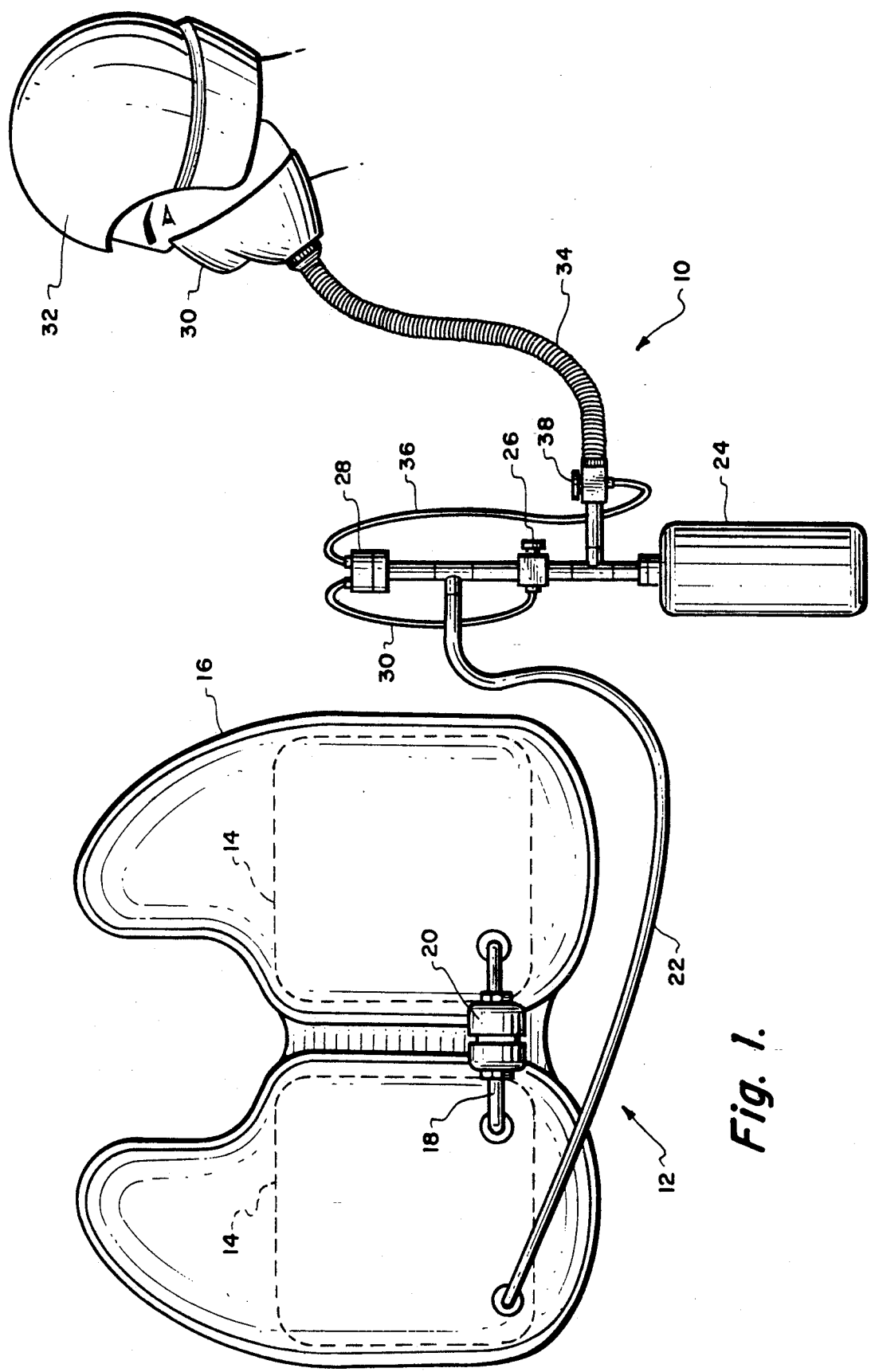
FIG. 1 is a schematic representation of the inflatable bladder system of the present invention.

Referring to the drawings and the characters of reference marked thereon. FIG. 1 schematically illustrates the bladder system of the present invention, designated generally as 10. (It is understood that FIG. 1 is meant to be only a schematic representation, the elements shown neither being in their preferred orientation nor accurate relative sizes.) Inflatable bladder system 10 includes a bladder assembly 12. Bladder assembly 12 includes two bladders 14 housed within a covering 16. (Two bladders 14 are preferred because the use of two bladders provides ease in donning and doffing the bladder system 10.) Covering 16 is preferably formed of a fabric or nylon material. Pockets are sewn therein to contain the bladders 14. Each bladder is formed of an air-tight material, preferably nylon or neoprene. The bladders 14 are inserted into their respective pockets. The bladders 14 are in fluid communication with each other by tubing 18 and quick release coupling 20. The covering 16 may be sewn into or attached to a standard parachute harness, with very little modification of that harness. (Quick release coupling 20 allows removal of the bladders without concomitant loss of air inside of them.)

Fluid conduit or hose 22 provides pressurized air from breathing gas source 24. Valve 26, connected to breathing gas source 24, provides a controlled flow of the air to the bladders 14. Valve 26 is controlled by a pressure sensor 28, the electrical signal conducted by electrical conduit. Breathing gas source or container 24 also provides breathing gas to the mask 30 of the user 32 via a hose 34. This positive pressure breathing system also utilizes pressure sensor 28 to control the breathing gas supply, via electrical conduit 36 in association with valve 38.

Thus, in accordance with the desired parameters, breathing gas flow into the bladders 14 is regulated by the pressure in those bladders. The same control means within the pressure sensor 28 may also regulate flow to the positive pressure breathing mask 30. The pressure in the bladder may, therefore, be matched to the pressure of the breathing gas in the subject's lungs.

Figure 2:
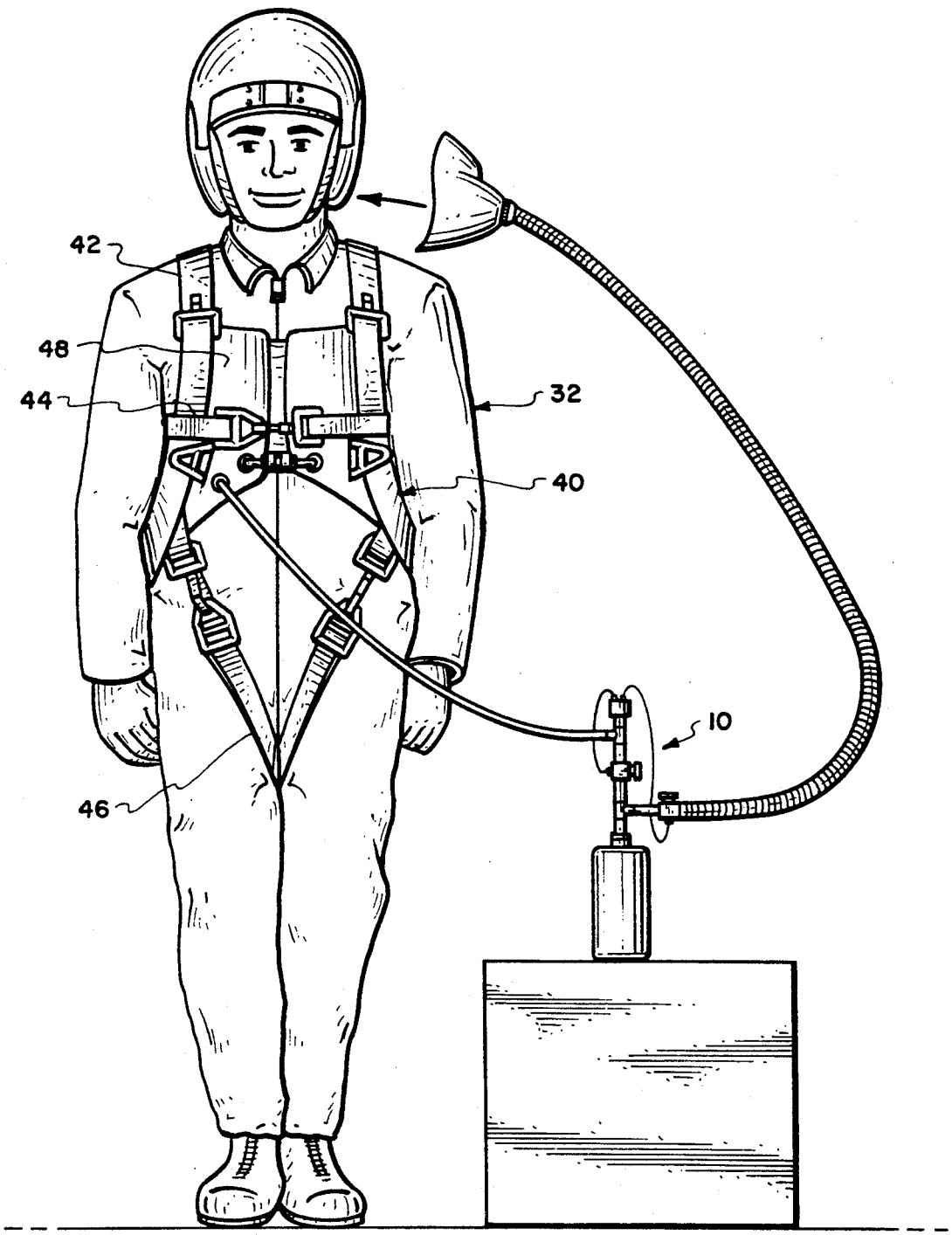
FIG. 2 illustrates a front view of a standing crew member utilizing the present invention in conjunction with a restraint harness containing a chest plate.

Referring now to FIG. 2, a crew member 32 is illustrated utilizing the bladder system 10 with a standard flight suit and parachute harness 40. The harness 40 includes shoulder straps 42 which extend around the back and down the chest. The shoulder straps 42 are linked by a cross strap 44 extending across the lower chest or upper abdomen. Leg straps 46 are also provided to maintain the necessary support required for ejection with the parachute.

The restraint harness 40 aids in securing a chestplate 48 which insures uniform distribution of loads over the crew member's rib cage. Such a chestplate is desirable while undergoing high G-induced forces during forward leaning posture.

The chestplate 48 is preferably formed of a light weight material such as fiberglass or another strong light weight composite.

The inflatable bladder system 10 of the present invention is particularly adaptable for use with the "Head Support/Spine Offloading Ejection Seat Insert" disclosed and claimed in U.S. Pat. No. 4,923,147 issued to present co-applicant William J. Adams. The subject matter disclosed in U.S. Pat. No. 4,923,147 is hereby incorporated by reference.

Figure 3:
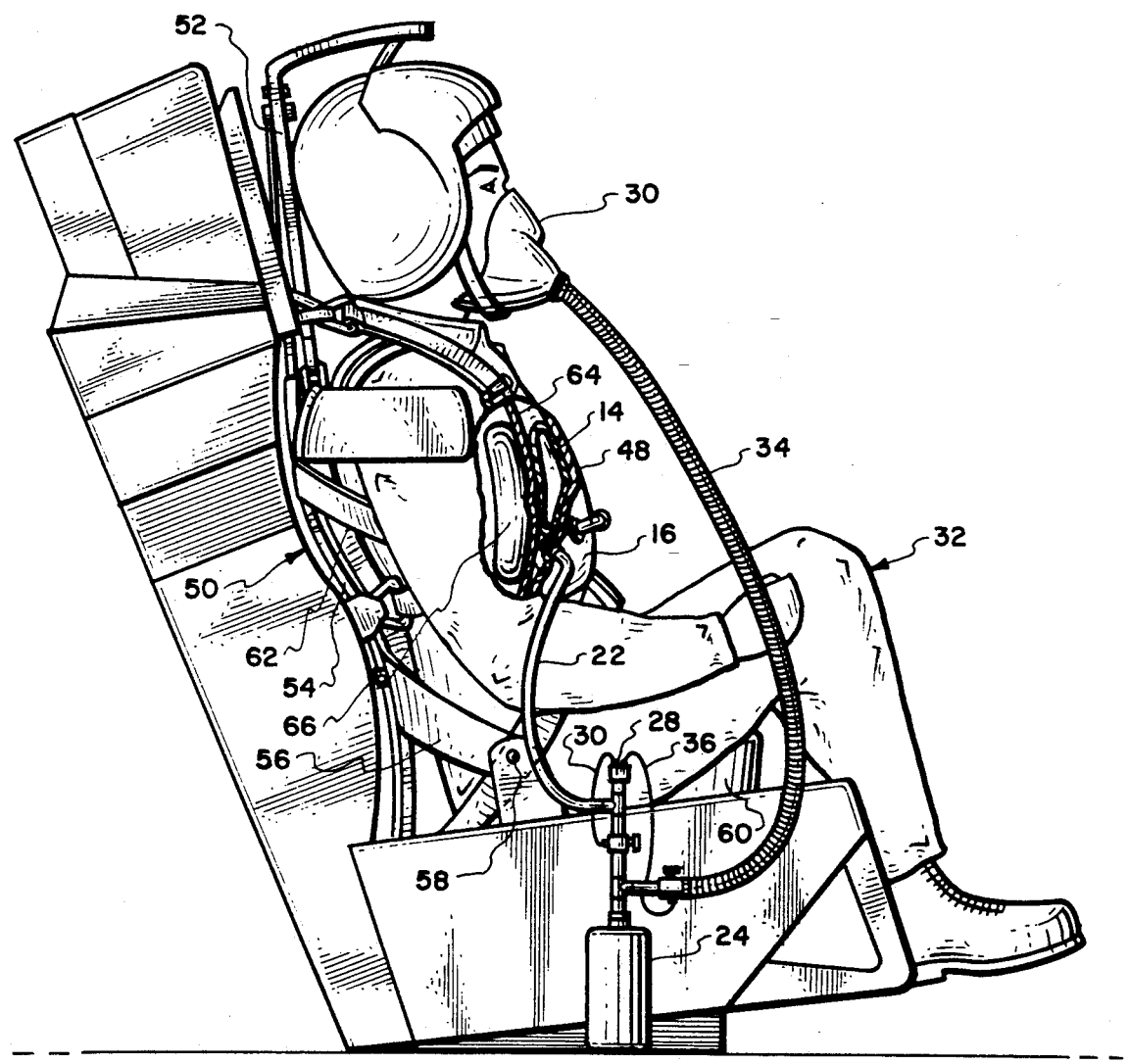
FIG. 3 is a side view showing the crew member strapped to a head support/spine offloading election seat insert, used in conjunction with the present invention.

Briefly the '147 patent discloses a seat insert insertable within the existing seat of a vehicle for maintaining a crew member of the vehicle in a forward posture during high G accelerations. Referring now to FIG. 3, the subject seat insert is illustrated, designated generally as 50. The seat insert 50 comprises an elongated head support member 52 for supporting the crew member's head during a forward leaning posture. A backplate assembly including a thoracic backplate 54 and a lumbar backplate 56, pivots forward (via pin joints 58) relative to a seat pan base assembly 60. Thoracic straps 62 are attached to the thoracic backplate 54 for allowing the crew member 32 to tightly secure himself between the chestplate 48 and the thoracic backplate 54. The thoracic straps 62 allow the pilot to be effectively "picked up" off of his spine during g-loading in the forward-leaning position. The compressive force along the pilot's spine is transferred to the seat pan base assembly 60 of the seat insert 50 and is loaded directly back onto the seat pan structure. Using this seat insert 50, the crew member can utilize the G-protection afforded by forward leaning without suffering neck and back pain. His field of view remains close to what his field of view would be in an upright position, which is critical for tactical operation of the aircraft.

Use of the inflatable bladder system with the seat insert 50 is preferably accomplished by sandwiching the bladders 14 between the chest of the crew member (the chest wall being schematically represented as 64) and the chest plate 48 of the seat insert 50. In this figure, the lungs are also schematically represented at numeral designation 66. The bladders 14 and chestplate 48 are preferably located within the same pocket or covering 16. In this configuration, the pressure inside the lungs 66 is transferred through the chest wall 64 and into the bladders 14. This pressure is opposed by the pressure exerted by the chestplate itself. Thus, in other words, the bladder pressure can be controlled by the pressure inside the lungs. The bladder pressure can be synonymous with the lung pressure. As in the previous figures, the bladders are connected through conduit means 22 to a breathing gas source 24 which is part of a positive pressure breathing system for supplying air to the breathing mask 30. Therefore, the positive pressure breathing system may be used to match the pressure in the bladder to the pressure of the breathing gas in the subject's lungs.

In addition to its application with the seat insert disclosed in the '147 patent, the present invention is particularly adaptable for use with the buoyancy force suit disclosed and claimed in U.S. Pat. No. 4,925,133 entitled "Hydraulic Buoyancy Force Suit", issued to S. G. Wurst, K. M. Munson and present co-applicant W. J. Adams. The subject matter of U.S. Pat. No. 4,925,133 is hereby incorporated by reference.

Figure 4:
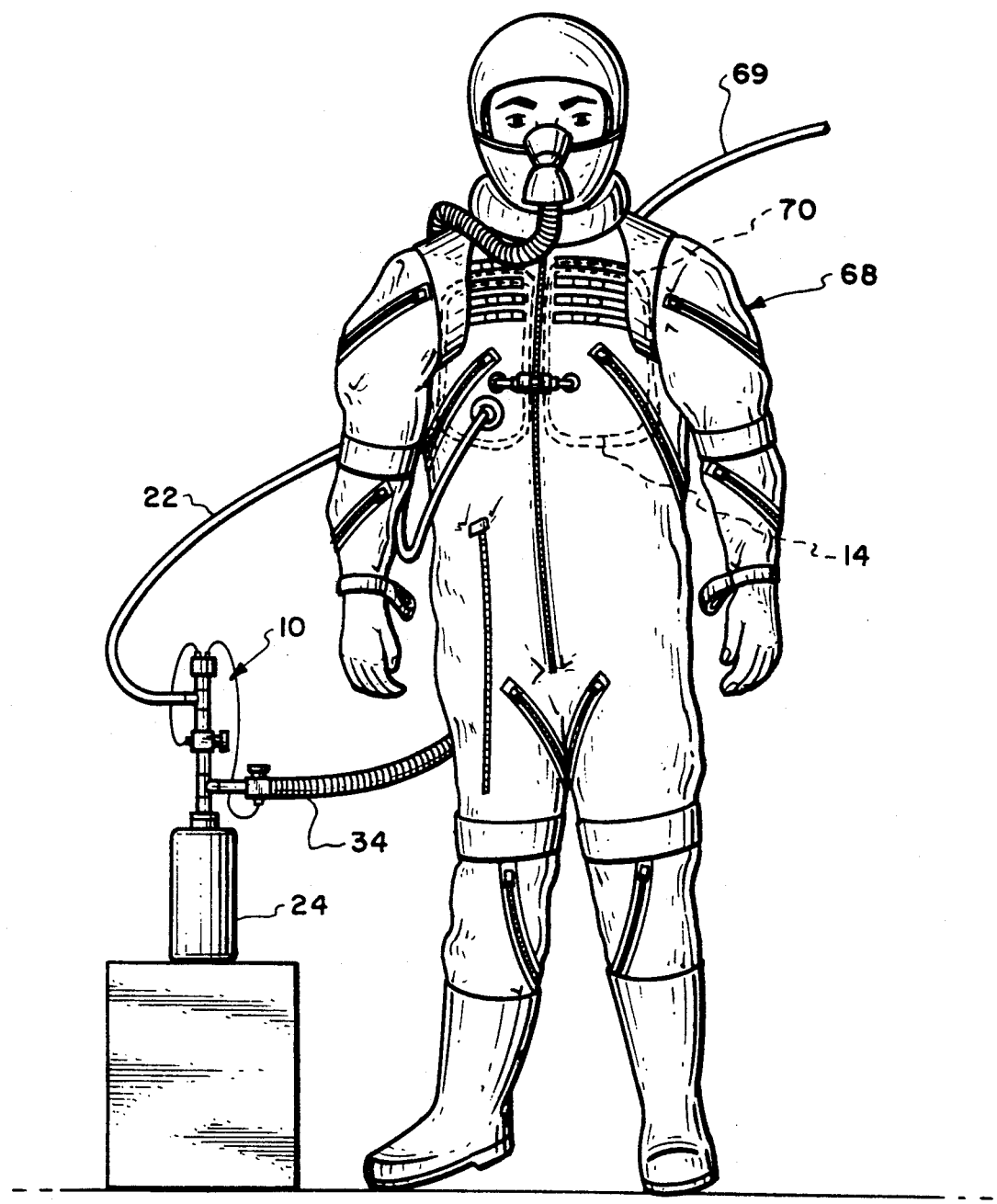
FIG. 4 illustrates a standing crew member wearing a hydraulic buoyancy force suit and utilizing the present invention.

Referring now to FIG. 4, the hydraulic buoyancy force suit of the '133 patent is illustrated, designated generally as 68. The hydraulic buoyancy force suit 68 is used to maintain useful consciousness and reduce the risk of injury for subjects exposed to high levels of acceleration while in a vehicle. Although its specific features are not illustrated in FIG. 4, the force suit is connected to a fluid reservoir via conduit 69, breathing assist means, and means for supporting these components to the vehicle. The buoyancy force suit supports the subject within the vehicle. It includes at least two layers of fabric, each layer being impermeable to a substantially incompressible fluid. The suit fits substantially over the entire subject, including the subject's neck. The fluid reservoir is in fluid communication with the buoyancy force suit and provides make-up fluid to the suit in the event of its expansion during acceleration.

The fluid reservoir is maintained at substantially the subject's head level, to maintain the reservoir fluid level at approximately eye level. This maintains an optimal fluid pressure gradient on the wearer's body for assuring efficient blood supply to the subject's brain. The force suit provides a balanced counterpressure to the force of acceleration, thereby reducing the expansion of the subject's blood vessels and pooling of blood. Pressure applied to the person wearing the suit is very closely matched to the hydrostatic pressures within the blood vessels throughout the body, including the neck. This match is achieved through the use of the reservoir which is in fluid communication with the suit. The surface of the fluid within the reservoir is kept at eye level. This allows the correct pressure to be applied to both the body and the neck. The suit uses a hydraulic medium to achieve proper distribution and magnitude of the acceleration forces.

The buoyancy forces provided by the suit support the wearer's muscle masses, viscera, etc., thereby removing their weight from the skeleton and thus minimizing injury risk to the skeleton during intense short term accelerations. As can be seen by dashed lines designated 14 in FIG. 4, the bladders of the inflatable system 10 of the present invention can be located within the hydraulic buoyancy force suit 68. As shown in FIG. 4, in the hydraulic force buoyancy suit 68, these bladders are located in two suit pockets 70 (one on each side of the chest). The pockets containing the bladders are located on the innermost layer of the suit 68 and thus adjacent to the chest wall of the pilot.

Use of the inflatable bladder system with the hydraulic buoyancy force suit 68 is as follows:

The buoyancy suit containing the bladders is donned by a pilot. The donning process, which includes cinching straps and connectors and zipping zippers also includes connecting the quick disconnect coupling 20 (i.e. see FIG. 1). This coupling 20 connects the two bladders 14 covering the chest so that the pressure in each is the same and so that each can be filled from a single supply line. The pilot sits in the aircraft seat, the bladders and breathing mask 30 are connected to the aircraft breathing gas supply 24 and the buoyancy suit is connected to a water supply.

During flight at low G levels, the pressure in the breathing mask is close to ambient pressure. Consequently, there is little if any positive (relative to ambient) pressure in the breathing mask or the bladders. As the G level increases, the pressure in the bladders will rise. The bladder pressure increase results from the increased pressure of the water in the suit pressing against the bladders and the increased pressure of the fluids and tissues of the body that also press against the bladders. The pressure sensor 28 detects the increased bladder pressure and raises the pressure in the mask. (Because of the G protection provided by the suit, the amount of mask pressure needed to counter the G force will be less than that required if the pilot was not wearing the suit.) The mask pressure will be increased to match the bladder pressure. However, the mask pressure will not be allowed to increase above about 60-70 mmHg pressure; pressures above this level can cause mask leakage and sinus injury.

Since the bladder pressure changes with changes in the rate and depth of respiration, the bladder pressure can be regulated (via valve 26) to assist in breathing. For example, the pressure in the bladder can be increased during exhalation to help the pilot expel the air in his lungs. Exhalation during positive pressure breathing (PPB) is physically more difficult than during normal breathing. Thus, the bladders can reduce the work associated with PPB. Similarly, because the bladder pressure matches breathing rate and depth of respiration, hyperventilation —a potentially harmful mode of respiration often observed during PPB—can be controlled.

In a hyperventilating pilot, the rapid rate of breathing creates rapid lung pressure changes that are transferred to the bladder and, in turn, detected by the pressure sensor component 28 of the bladder system. The pilot can then be warned that he is hyperventilating and risking unconsciousness if his breathing rate does not decrease. Additionally, the pressure in the bladders can be increased or decreased to assist the pilot in overcoming the hyperventilation.

The bladder system of the present invention used with an HS/SOD and PPB system, operates in a manner similar to that of the bladder system used with the Buoyancy Suit. That is, acceleration-caused increases in bladder pressure are used to control the pressure in a PPB mask to counter G forces, detect and prevent hyperventilation and reduce the effort required for exhalation during PPB. Thus, similar to the use of the bladders with the Buoyancy Suit, the use of the bladders with the HS/SOD increases the pilot's G tolerance by providing him with two methods of G protection, in this case, PPB and Forward Leaning. Furthermore, the use of the bladder system with the HS/SOD provides the capability of controlling the level of PPB based on body position in the acceleration field as explained in the following paragraph. Finally, a properly-inflated bladder system will help maintain tight-fitting, yet comfortable connections between the backplate and chest plate components of HS/SOD.

In using the bladder system with the HS/SOD, a pilot would don the HS/SOD parachute harness containing the bladders (FIG. 1) and sit in the aircraft seat (FIG. 3). He would then connect the positive pressure breathing mask 30 and bladders 14 to the breathing gas supply 24. Similar to the capabilities of the bladders used with the buoyancy suit, the bladders worn with the HS/SOD could be used for detecting lung pressure at low G and high G conditions, and for assisting with pilot breathing under various abnormal situations, such as hyperventilation. Furthermore, with the HS/SOD, a pilot can be supported in a range of body positions during periods of aircraft acceleration. For different positions, the magnitude and direction of the resulting acceleration force on the pilot may be different from the acceleration on the aircraft. Unlike conventional methods of PPB control, that rely on aircraft acceleration detection, with the bladder system, PPB control could be tied to the actual levels of pilot acceleration.

It is emphasized that the uses of the present invention as described above with respect to the hydraulic buoyancy force suit and the head support/spinal offloading ejection seat insert are added by way of illustration and not limitation. The bladder system of the present invention can be used on its own to control a positive pressure breathing system. Furthermore, it could be used to monitor frequency of breathing, depth of respiration and other respiratory parameters for pilots. In biomedical applications it may be used to measure the frequency and depth of breathing (as well as other physiological parameters) and control breathing devices used for biomedical purposes.

For example, the bladders 14 shown in FIG. 1, could be placed around the chest of a patient requiring measurements of breathing rate and depth of respiration. These measurements would be obtained by connecting the pressure sensor 28 to a strip chart or other recorder and supplying gas to the bladders 14 through the gas supply 24. If a gas mask, connected to a source of breathing gas, was placed around the mouth of the patient, and the closing and opening of valve 26 was cycled to match respiratory rate, patient respiration could be assisted. This system may provide total assistance for a patient who is incapable of breathing independently as a result of injury or disease. (Patients requiring total respiratory assistance are currently placed in iron lungs, an expensive and immobilizing treatment. The present bladder assembly, including a breathing mask supplying breathing gas under positive pressure connected to a portable gas supply, may therefore replace an iron lung). Finally, in some uses of the bladder system, the gas source may include high concentrations of oxygen.

Obviously, many modifications and variations of the present invention are possible in light of the above teachings. It is, therefore, to be understood that within the scope of the appended claims the invention may be practiced otherwise than as specifically described.

What is claimed and desired to secured by Letters Patent of the United States is:

1. An apparatus for matching the lung pressure of a subject with the pressure in a positive pressure breathing (PPB) system, comprising:
   a bladder assembly, comprising:
   a) two flexible bladders positionable substantially solely over the chest of the subject, containing fluid having substantially the same density as the breathing gas in the subject's lungs, and a fluid conduit connecting said two bladders:
b) a fluid source for supplying fluid having substantially the same density as the breathing gas in the subject's lungs;
c) fluid conduit means connected between said bladder and said fluid source, including valve means, for regulating the flow of said fluid from said source to said bladder;
d) pressure sensing means connected to said fluid conduit means for monitoring bladder pressure, and
e) a positive pressure breathing system connected to said pressure sensing means for providing the subject said breathing gas, said positive pressure breathing system including control means for matching the pressure in the bladder to the pressure of the breathing gas in the subject's lungs.

2. The apparatus of claim 3, wherein said fluid supplied comprises air.

3. An inflatable bladder system for use with a seat insert of a vehicle, said seat insert being of the type for maintaining a crew member of the vehicle in a forward leaning posture during high G acceleration, said insert having a rigid chestplate strapped to a backplate for securing said crew member to said seat insert, said inflatable bladder system, comprising:
a bladder assembly, comprising:
a) at least one flexible bladder positioned between said chestplate and the subject's chest;
b) a fluid source for supplying fluid having substantially the same density as the breathing gas in the subject's lungs;
c) fluid conduit means connected between said bladder and said fluid source, including valve means for regulating the flow of said fluid from said source to said bladder;
d) pressure sensing means connected to said fluid conduit means for monitoring bladder pressure; and
e) a positive pressure breathing system connected to said pressure sensing means for providing the subject said breathing gas, said positive pressure breathing system including control means for matching the pressure in the bladder to the pressure of the breathing gas in the subject's lungs.

4. The apparatus of claim 3, wherein said bladder assembly includes two bladders and a fluid conduit connecting said two bladders.

5. The apparatus of claim 4, wherein said fluid supplied comprises air.

6. An inflatable bladder system for use with a buoyancy force suit of the type utilized by a subject exposed to high levels of acceleration while in a vehicle, said buoyancy force suit providing a balanced counterpressure to the force of acceleration, reducing distension in the subject's blood vessels and the pooling of blood, said inflatable bladder system, comprising:
a bladder assembly, comprising:
a) at least one flexible bladder positioned between said buoyancy force suit and said chest plate and the subject's chest;
b) a fluid source for supplying fluid having substantially the same density as the breathing gas in the subject's lungs;
c) fluid conduit means connected between said bladder and said fluid source, including valve means for regulating the flow of said fluid from said source to said bladder;
d) pressure sensing means connected to said fluid conduit means for monitoring bladder pressure; and
e) a positive pressure breathing system connected to said pressure sensing means for providing the subject said breathing gas, said positive pressure breathing system including control means for matching the pressure in the bladder to the pressure of the breathing gas in the subject's lungs.

7. The apparatus of claim 6, wherein said bladder assembly includes two bladders and a fluid conduit connecting said two bladders.

8. The apparatus of claim 7, wherein said fluid supplied comprises air.

* * * * *